US011323982B2

(12) United States Patent
Ozturk et al.

(10) Patent No.: US 11,323,982 B2
(45) Date of Patent: May 3, 2022

(54) MODE CHANGE SIGNALING FOR A PLURALITY OF WIRELESS DEVICES

(71) Applicant: QUALCOMM Incorporated, San Diego, CA (US)

(72) Inventors: Ozcan Ozturk, San Diego, CA (US); Ajay Gupta, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/103,028

(22) Filed: Aug. 14, 2018

(65) Prior Publication Data

US 2019/0059074 A1 Feb. 21, 2019

Related U.S. Application Data

(60) Provisional application No. 62/546,985, filed on Aug. 17, 2017.

(51) Int. Cl.
*G08C 17/00* (2006.01)
*H04W 72/00* (2009.01)
(Continued)

(52) U.S. Cl.
CPC .......... *H04W 72/005* (2013.01); *H04W 4/06* (2013.01); *H04W 4/70* (2018.02); *H04W 12/037* (2021.01);
(Continued)

(58) Field of Classification Search
CPC ....... H04W 72/005; H04W 4/70; H04W 4/06; H04W 76/27; H04W 12/04; H04W 12/76;
(Continued)

(56) References Cited

U.S. PATENT DOCUMENTS 9,473,906 B2 * 10/2016 Yu ..................... H04W 36/0083
2008/0125158 A1 * 5/2008 Shostak .............. H04L 61/2069
455/519

(Continued)

FOREIGN PATENT DOCUMENTS

WO 2017051964 A1 3/2017

OTHER PUBLICATIONS

Ericsson, et al., "RRC Inactive State New Procedures in TS 23.502", 3GPP Draft; S2-173327 INACTIVE_NEWPROC_23502V1, 3rd Generation Partnership Project (3GPP), Mobile Competence Centre; 650, Route Des Lucioles; F-06921 Sophia-Antipolis Cedex; France, vol. SA WG2, No. Hangzhou, China; May 15, 2017-May 19, 2017, May 14, 2017 (May 14, 2017), 16 Pages, XP051281823, Retrieved from the Internet: URL: http://www.3gpp.org/ftp/Meetings_3GPP_SYNC/SA2/Docs/ [retrieved on May 14, 2017].
(Continued)

*Primary Examiner* — Thai D Hoang
(74) *Attorney, Agent, or Firm* — QUALCOMM Incorporated

(57) ABSTRACT

Certain aspects of the present disclosure relate to methods and apparatuses for signaling mode changes to a plurality of wireless devices. For example, certain aspects provide a method including determining, by a base station, a group of wireless devices of a plurality of wireless devices served by the base station to transition to a first mode of operation, wherein at least one of: the first mode of operation is an inactive mode or at least one of the group of wireless devices is in the inactive mode. The method further includes generating a message comprising information indicative of an identifier associated with the group of wireless devices and information indicative of the first mode of operation. The method further includes multicasting the message to the group of wireless devices.

28 Claims, 8 Drawing Sheets

(51) Int. Cl.

| | | |
|---|---|---|
| *H04W 4/70* | (2018.01) | |
| *H04W 76/27* | (2018.01) | |
| *H04W 52/02* | (2009.01) | |
| *H04W 4/06* | (2009.01) | |
| *H04W 12/037* | (2021.01) | |
| *H04W 12/76* | (2021.01) | |
| *H04W 12/0433* | (2021.01) | |
| *H04W 12/122* | (2021.01) | |
| *H04L 61/5069* | (2022.01) | |
| *H04W 12/04* | (2021.01) | |
| *H04W 48/10* | (2009.01) | |

(52) U.S. Cl.
CPC ....... *H04W 12/0433* (2021.01); *H04W 12/76* (2021.01); *H04W 52/0216* (2013.01); *H04W 52/0219* (2013.01); *H04W 52/0235* (2013.01); *H04W 76/27* (2018.02); *H04L 61/2069* (2013.01); *H04W 12/04* (2013.01); *H04W 12/122* (2021.01); *H04W 48/10* (2013.01)

(58) Field of Classification Search
CPC ........... H04W 12/037; H04W 12/0433; H04W 52/0216; H04W 52/0219; H04W 52/0235; H04W 48/10; H04L 61/2069
USPC .......................................................... 370/311
See application file for complete search history.

(56) References Cited

U.S. PATENT DOCUMENTS

| | | | | |
|---|---|---|---|---|
| 2012/0281647 | A1* | 11/2012 | Kuo | ...................... H04L 1/1812 |
| | | | | 370/329 |
| 2012/0302240 | A1* | 11/2012 | Tamaki | ............. H04W 36/0016 |
| | | | | 455/436 |
| 2013/0121300 | A1* | 5/2013 | Cho | .................... H04W 72/042 |
| | | | | 370/329 |
| 2013/0252643 | A1* | 9/2013 | Park | .................. H04W 52/0219 |
| | | | | 455/458 |
| 2014/0004900 | A1* | 1/2014 | Lee | .................... H04W 36/0009 |
| | | | | 455/525 |
| 2014/0226552 | A1 | 8/2014 | Niu et al. | |
| 2014/0307726 | A1 | 10/2014 | Kang et al. | |
| 2016/0119762 | A1 | 4/2016 | Zhu et al. | |
| 2016/0286527 | A1 | 9/2016 | Yu et al. | |
| 2017/0201964 | A1 | 7/2017 | Gupta et al. | |
| 2017/0257822 | A1* | 9/2017 | Harris | ................... H04W 48/18 |
| 2017/0339723 | A1* | 11/2017 | Fujishiro | ............... H04W 76/40 |
| 2018/0020382 | A1* | 1/2018 | Kim | ....................... H04W 48/02 |
| 2018/0199344 | A1* | 7/2018 | Liao | ................... H04W 56/0005 |
| 2019/0059074 | A1* | 2/2019 | Ozturk | .................... H04W 4/70 |
| 2020/0029237 | A1* | 1/2020 | Kim | ....................... H04W 24/10 |
| 2021/0337516 | A1* | 10/2021 | Fujishiro | ................. H04W 4/46 |
| 2021/0345358 | A1* | 11/2021 | Wang | .................... H04W 76/27 |
| 2021/0360702 | A1* | 11/2021 | Jang | .................. H04W 52/0216 |

OTHER PUBLICATIONS

Ericsson: "On a Wake-Up Signal for Active Mode UEs", 3GPP Draft; R1-1709070, 3rd Generation Partnership Project (3GPP), Mobile Competence Centre; 650, Route Des Lucioles; F-06921 Sophia-Antipolis Cedex; France, vol. Ran WG1, No. Hangzhou; May 15, 2017-May 19, 2017, May 14, 2017 (May 14, 2017), pp. 1-2, XP051274228, Retrieved from the Internet: URL: http://www.3gpp.org/ftp/Meetings_3GPP_SYNC/RAN1/Docs/ [retrieved on May 14, 2017].

International Search Report and Written Opinion—PCT/US2018/000158—ISA/EPO—Nov. 16, 2018.

* cited by examiner

MODE CHANGE SIGNALING FOR A PLURALITY OF WIRELESS DEVICES

CROSS-REFERENCE TO RELATED APPLICATIONS

This application claims the benefit of U.S. Provisional Patent No. 62/546,985, filed Aug. 17, 2017. The content of the provisional application is hereby incorporated by reference in its entirety.

INTRODUCTION

Aspects of the present disclosure relate to communication systems, and more particularly, to systems and methods for signaling mode changes to a plurality of wireless devices.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for signaling mode changes to a group of wireless devices. The method includes serving, by a base station, a plurality of wireless devices. The method further includes determining, by the base station, a group of wireless devices of the plurality of wireless devices to transition to a first mode of operation, wherein at least one of: the first mode of operation is an inactive mode or at least one of the group of wireless devices is in the inactive mode. The method further includes generating, by the base station, a message comprising information indicative of an identifier associated with the group of wireless devices and information indicative of the first mode of operation. The method further includes multicasting, by the base station, the message to the group of wireless devices.

Certain aspects provide a base station. The base station includes a memory and a processor. The processor is configured to serve a plurality of wireless devices. The processor is further configured to determine a group of wireless devices of the plurality of wireless devices to transition to a first mode of operation, wherein at least one of: the first mode of operation is an inactive mode or at least one of the group of wireless devices is in the inactive mode. The processor is further configured to generate a message comprising information indicative of an identifier associated with the group of wireless devices and information indicative of the first mode of operation. The processor is further configured to multicast the message to the group of wireless devices.

Certain aspects provide a base station. The base station includes means for serving a plurality of wireless devices. The base station further includes means for determining a group of wireless devices of the plurality of wireless devices to transition to a first mode of operation, wherein at least one of: the first mode of operation is an inactive mode or at least one of the group of wireless devices is in the inactive mode. The base station further includes means for generating a message comprising information indicative of an identifier associated with the group of wireless devices and information indicative of the first mode of operation. The base station further includes means for multicasting the message to the group of wireless devices.

Certain aspects provide a non-transitory computer readable storage medium that stores instructions that when executed by a base station cause the base station to perform a method for signaling mode changes to a group of wireless devices. The method includes serving, by a base station, a plurality of wireless devices. The method further includes determining, by the base station, a group of wireless devices of the plurality of wireless devices to transition to a first mode of operation, wherein at least one of: the first mode of operation is an inactive mode or at least one of the group of wireless devices is in the inactive mode. The method further includes generating, by the base station, a message comprising information indicative of an identifier associated with the group of wireless devices and information indicative of the first mode of operation. The method further includes multicasting, by the base station, the message to the group of wireless devices.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
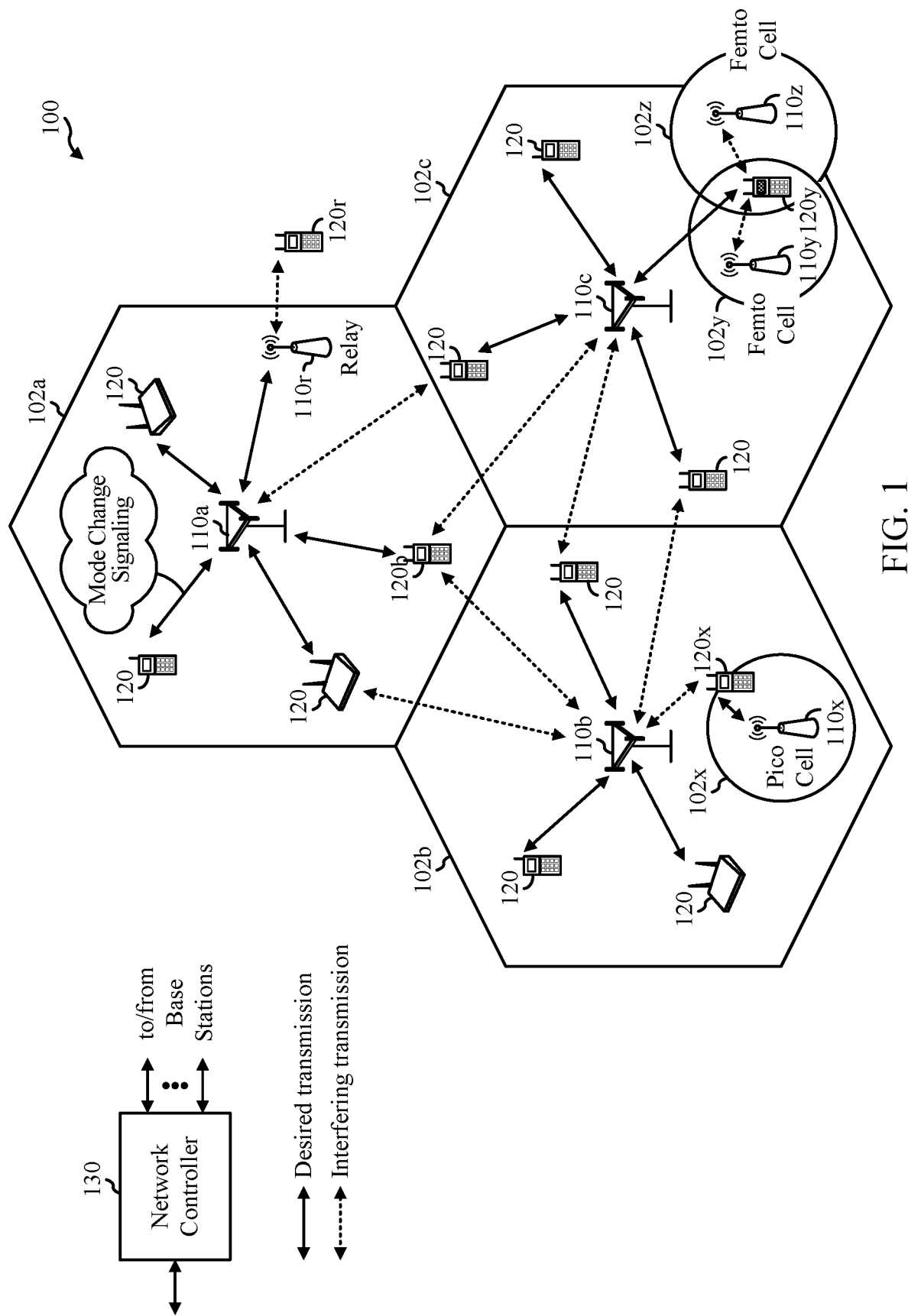
FIG. 1 is a block diagram conceptually illustrating an example telecommunications system, in accordance with certain aspects of the present disclosure.

Aspects of the present disclosure provide apparatus, methods, processing systems, and computer readable mediums for signaling from a base station (BS) to a plurality of user equipment (UEs) to change a mode of operation of the UEs. For example, a UE may be configured to operate in a plurality of modes (e.g., Radio Resource Control (RRC) modes), such as an idle mode (e.g., RRC idle mode), inactive mode (e.g., RRC inactive mode), and a connected mode (e.g., RRC connected mode). In different modes (also referred to as operating states), the UE may have different amounts of radio resources associated with it that define the radio resources that the UE can use in the given mode. Since different amounts of radio resources are used in different modes, the UE may have different levels of power consumption in the different modes.

For example, in certain aspects, in an idle mode, the UE does not have an active radio link with the core network. Further, in certain aspects, in the idle mode, the core network knows the UE is present on the network (e.g., UE has an assigned IP address), but the base station does not have any information (e.g., context information) about the UE and the UE does not store any context information. In the idle mode, the UE may monitor a paging channel, perform neighboring cell measurements and (re)selection, acquire system information, etc. The UE may be able to receive broadcast or multi-cast data, but may not be able to send or receive unicast data. Since the UE does not have an active radio link with the core network in the idle mode, and there is no context information for a connection with a base station, the power consumption in idle mode may be relatively lower than in connected mode or inactive mode.

In certain aspects, in a connected mode, the UE has an active radio link with the core network and can communicate (i.e., send or receive) unicast data with a base station. In addition, both the core network and base station may have information (e.g., context information) about the UE. The UE may further store such context information for a connection with the core network. The core network may also know the location of the UE at the cell level. Since the UE does have an active radio link with the core network in the connected mode and there is context information for a connection with a base station, the power consumption in connected mode may be relatively higher than in the idle mode and the inactive mode.

In certain aspects, in an inactive mode, the UE maintains some of the context information (e.g., information that remains valid after inactivity periods such as access stratum (AS) security context, UE capability information, etc.), unlike idle mode, but less than all of the context information, unlike active mode. In certain aspects, inactive mode is a type of standby mode. By maintaining some context information, the UE may be able to more quickly transition to connected mode from inactive mode than from idle mode. However, relative power consumption in inactive mode at the UE may be lower than connected mode, but higher than idle mode.

In certain aspects, a base station may signal to a UE to change modes using a unicast message, such as a RRC connection release message. However, the base station may then need to signal each UE individually to change modes, which may be inefficient and consume network resources.

Accordingly, certain aspects herein relate to signaling from a base station to a plurality of UEs to change a mode of operation of the UEs.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. In certain aspects, BSs in wireless communication network 100 are configured signal a plurality of UEs to change a mode of operation of the UEs.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102*y* and 102*z*, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110*r* may communicate with the BS 110*a* and a UE 120*r* in order to facilitate communication between the BS 110*a* and the UE 120*r*. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120*x*, 120*y*, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
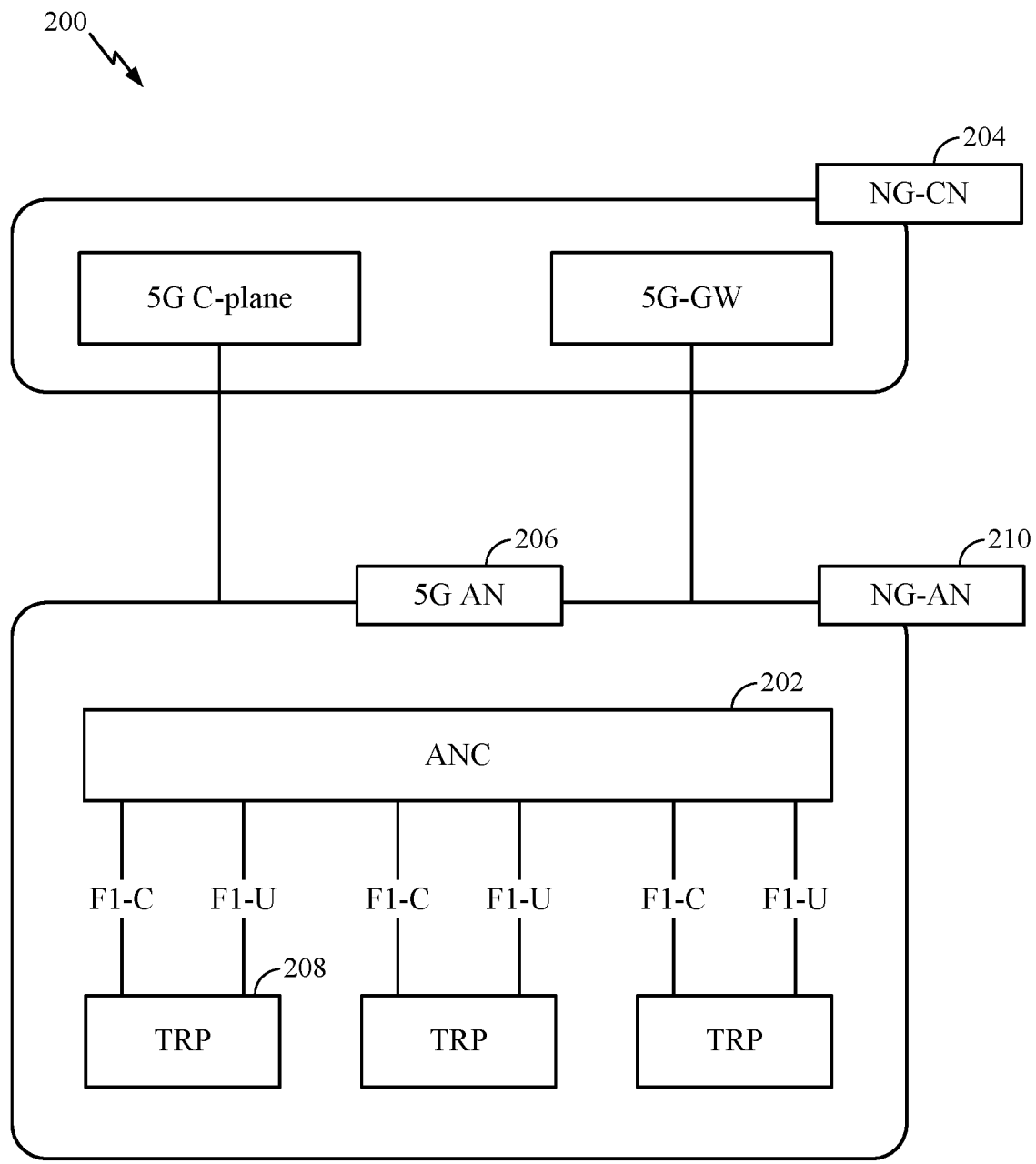
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN)

204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
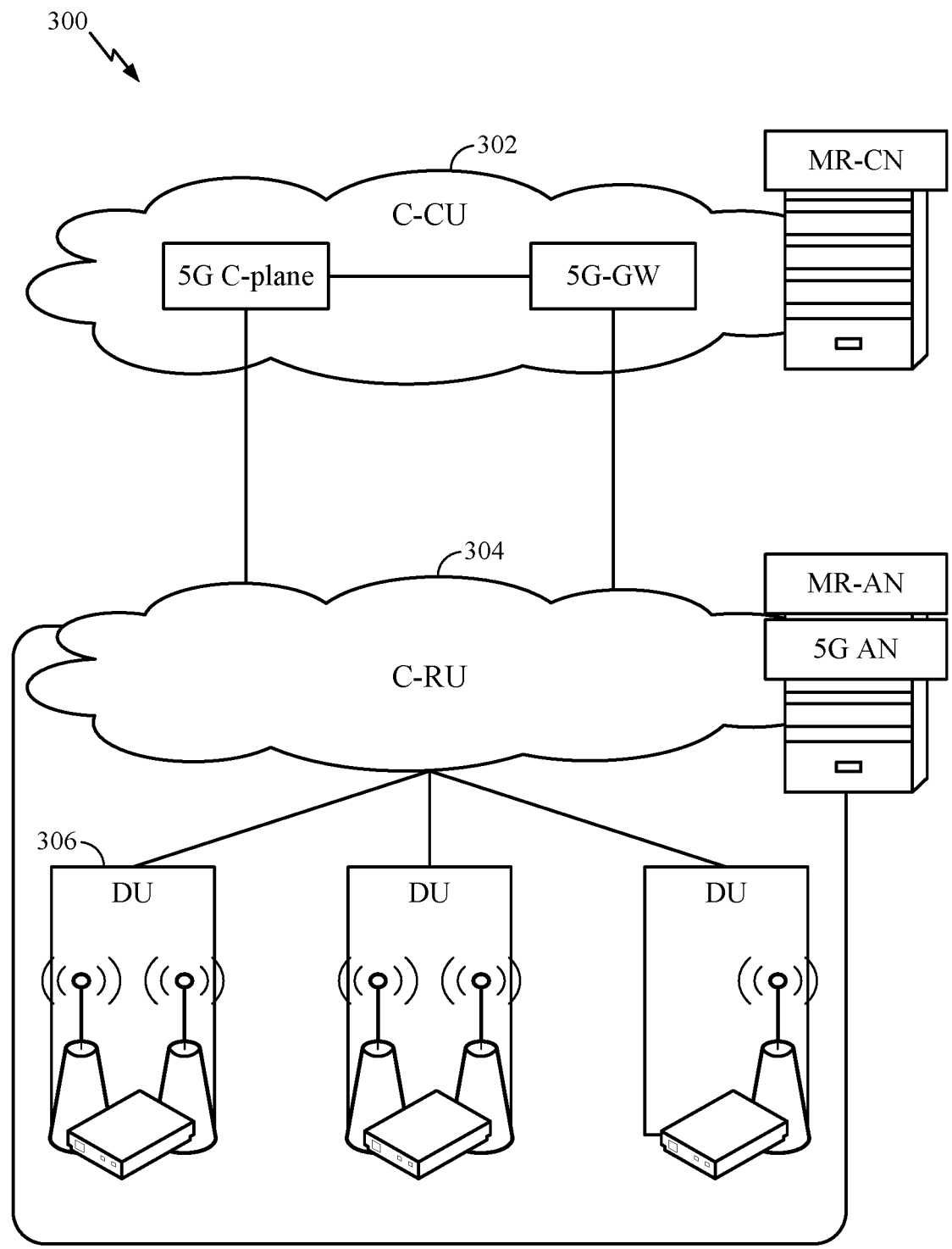
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
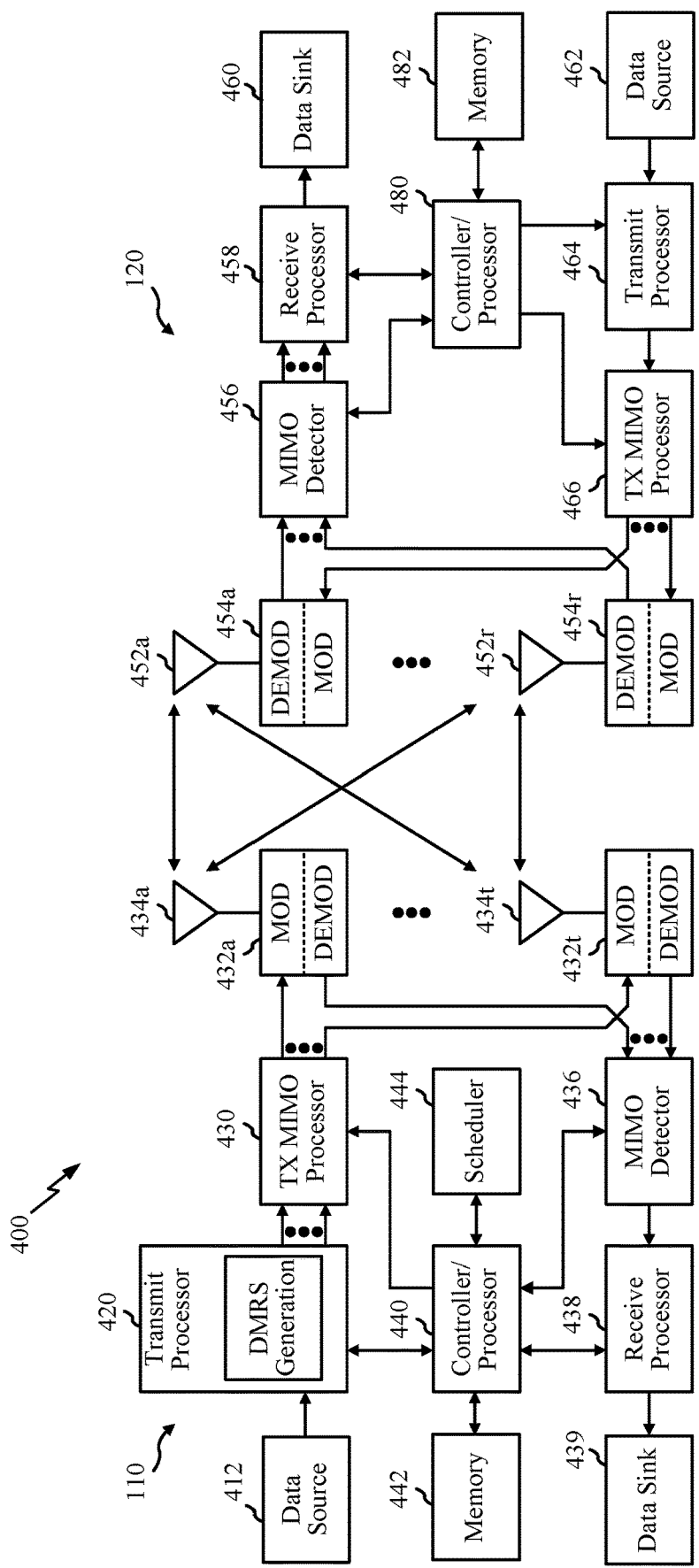
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 460, 438, and/or controller/processor 440 of the BS 110 may be used to perform the various techniques and methods described herein. For example, antennas 434, processors 420, 460, 438, and/or controller/processor 440 of the BS 110 may be used to perform the operations 700 of FIG. 7.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
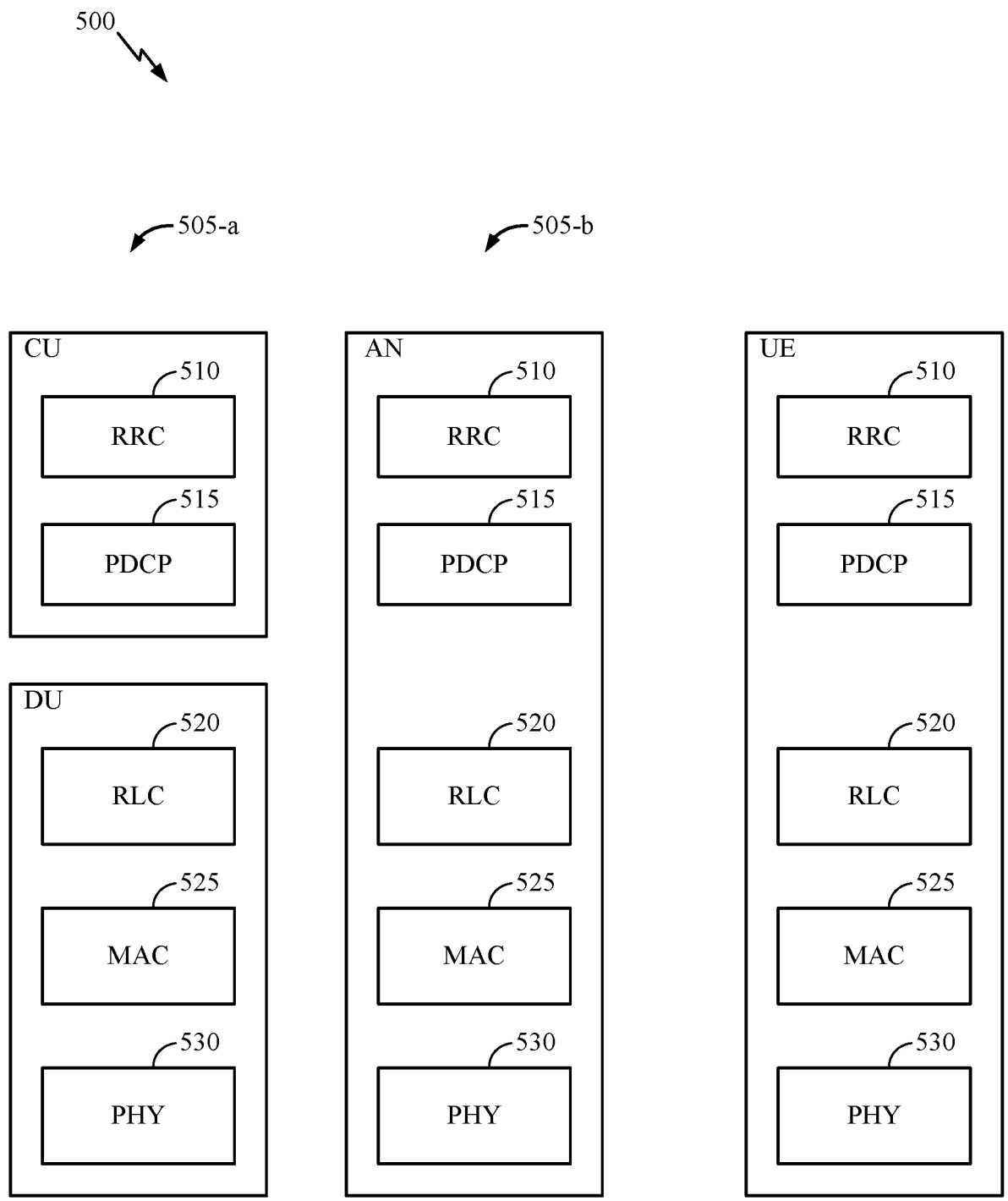
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
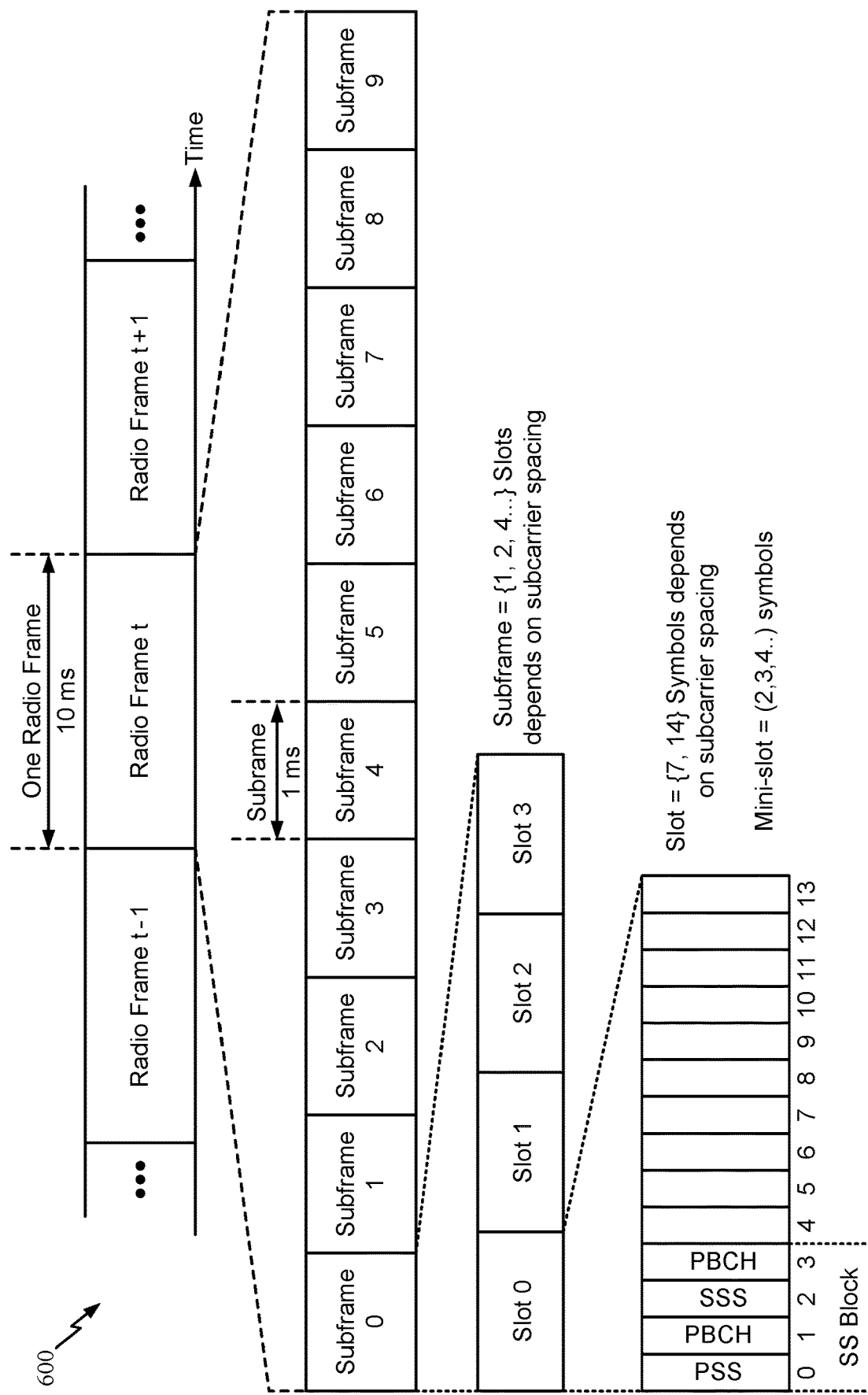
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Mode Change Operations

Aspects of the present disclosure relate to signaling from a BS to a plurality of UEs to change a mode of operation (e.g., connected, idle, inactive, etc.) of the UEs. In certain aspects, due to the distributed architecture of a BS including a CU coupled to a plurality of DUs, a large number of UEs may be served by a single CU. In particular, each DU itself may serve multiple UEs. Therefore, a single CU coupled to the plurality of DUs serves each of the multiple UEs served by each of the plurality of DUs. A large number of UEs served by a BS may at times overload the BS. For example, as discussed, if a large number of UEs are in connected mode with the BS, the BS may need to store context information for each of the UEs, and communication resources (e.g., resources of an uplink and/or downlink channel between the base station and the UEs, such as frequency resources including tones, time resources including symbols, and spatial resources including spatial streams) may be allocated to each of the large number of UEs. If the number of UEs in connected mode served by the base station is large, the base station may need to move some of the UEs to a different mode (e.g., idle or inactive mode) such as to ensure there are sufficient communication resources for UEs in the connected mode.

In certain aspects, to transition a UE between different modes (e.g., connected mode to idle mode), a base station (e.g., BS 110) may unicast a message (e.g., RRC connection release message) to a UE (e.g., UE 120). The UE 120 receiving the message may then transition to idle mode (or a mode indicated in the message). However, if BS 110 is overloaded and needs to transition a number of UEs 120 to a different mode, BS 110 may need to unicast several different such messages, each to a different UE 120, to transition each of the UEs 120. The transmission of multiple unicast messages by the UE 120 may utilize a number of resources (e.g., processor, radio, etc.) in BS 110 for generating the messages and may utilize a number of communication resources for transmitting the messages. Accordingly, certain aspects herein provide techniques for signaling from a base station to a plurality of UEs to change a mode of operation of the UEs.

In certain aspects, BS 110 sends a message (e.g., multicasts a mode change message) to a plurality of UEs 120 to change a mode of operation of the UEs 120. The message may indicate one or more of the following: for the UEs 120 in a connected mode to transition to an inactive mode, for the UEs 120 in an idle mode to transition to an inactive mode, for the UEs 120 in a connected mode to transition to an idle mode; for the UEs 120 in an idle mode to transition to a connected mode; for the UEs 120 in an inactive mode to transition to a connected mode; or for the UEs 120 in an inactive mode to transition to an idle mode. The UEs 120 receiving the message may then transition to the indicated mode of operation in the message. By sending a single message to a plurality of UEs 120 to change a mode of operation, a reduced number of communication resources are used for communicating the change of mode of operation to the plurality of UEs 120. Such reduced resource usage can benefit the overall operation of the wireless communication system by freeing such resources for other uses, such as increasing data throughput in the wireless communication system. Further, processing time for generating messages at the BS 110 is reduced, thereby improving performance of the BS 110.

In certain aspects, the techniques discussed herein for sending a single message to a plurality of UEs 120 to change a mode of operation may be used even when the UEs 120 receiving the message are in an inactive mode, or are transitioned to an inactive mode where the UEs 120 do not receive messages such as on a bearer requiring a connected mode. In addition, in certain aspects, the techniques discussed herein for sending a single message to a plurality of UEs 120 to change a mode of operation may be independent of which bearers are used by the plurality of UEs 120 for communicating. For example, the plurality of UEs 120 may be using the same or different bearers.

In certain aspects, the message is sent in a physical control channel from the BS 110 to the UEs 120. In certain aspects, the message is delivered via RRC. In certain aspects, the BS 110 pages the UEs 120 in connected mode, the page indicating to the UEs 120 a timing (e.g., subframe) to listen for and receive the message. For example, the UEs 120 may be in a discontinuous reception (DRX) mode where the receiver of each of the UEs 120 may be off or in a low power state at certain times, and only is turned on to receive signals at certain times. The UEs 120 may receive the page and listen for and receive the message during the indicated timing.

In certain aspects, the message includes an identifier of a group of UEs 120 (e.g., a subset of all UEs 120 served by BS 110) to which the message pertains that should change a mode of operation based on receiving the message. The message may include individual identifiers (e.g., access terminal identifier (AID), cell radio network temporary identifier (C-RNTI), etc.) associated with individual UEs 120. However, including multiple individual identifiers may take a large amount of bandwidth to send a large message including the individual identifiers. Accordingly, in certain aspects, the message may include a single identifier associated with a group of UEs 120. For example, the single identifier may be a common RNTI associated with a group of UEs 120. Each UE 120 receiving the message may be configured to determine if the change in mode of operation indicated in the message is for the UE 120 based on the identifier. For example, if the UE 120 receives such a message with an identifier of a group that the UE 120 is not included in, the UE 120 ignores the message. If the UE 120 receives such a message and determines it includes an identifier of a group that the UE 120 is included in, the UE 120 then transitions to the indicated mode of operation in the message.

In certain aspects, the single identifier for a group of UEs 120 may be assigned and signaled (e.g., by a BS 110 such as using RRC such as when the UE 120 connects to the BS 110) to each UE 120 of the group of UEs 120 using unicast messages while the UEs 120 are in a connected mode with the BS 110. In certain aspects, a UE 120 signals to a BS 110 (e.g., as part of a RRC connection procedure when the UE 120 connects to BS 110) if it is capable of changing mode of operation based on receiving a message as discussed. Accordingly, BS 110 may only assign a UE 120 to a group if the UE 120 is capable.

In certain aspects, a group of UEs 120 may correspond to UEs 120 with certain attributes such as service requirements (e.g., slices), numerologies, access classes, and/or other subscription and access information known to BS 110. BS 110 may then include UEs 120 that share a certain set of attributes in a group and signal an identifier of the group to the UEs 120 as discussed. For example, a network slice, in certain aspects is comprised of a collection of network functions (e.g., LTE network functions, 5G network function, etc.) as well as specific radio access technology (RAT) settings that are combined together for a specific use case (e.g., specific type of application, device, etc.). For example, a network slice may comprise a set of flows (i.e., stream of packets) whose source or destination is a certain type of device, such as sensors or IoT devices. Another example of a network slice may comprise a set of flows for a certain type of application, such as a gaming application or a voice over IP (VoIP) application. Therefore, in certain aspects, a group of UEs 120 may include UEs 120 associated with one or more network slices (e.g., communicating packets that are serviced by a network slice), such as the UEs 120 in the group may all be associated with each of the one or more network slices or the UEs 120 in the group may each be associated with at least one of the one or more network slices.

A numerology, in certain aspects, may refer to the specific resources (e.g., time, frequency, spatial etc.) assigned to a group of UEs 120. For example, different UEs 120 on the UL and/or the DL may be assigned different subcarrier spacing and or slot length of a time slot to communicating data in the network (e.g., with BS 110). Therefore, in certain aspects, a group of UEs 120 may include UEs 120 assigned or associated with one or more numerologies, such as the UEs 120 in the group may all be associated with each of the one or more numerologies or the UEs 120 in the group may each be associated with at least one of the one or more numerologies.

In certain aspects, the message including an indication of a group of UEs 120 to change a mode of operation of the group of UEs 120 further includes an indication of a timer (e.g., prohibit timer) that indicates a time period (e.g., threshold time) before which the UE 120 cannot attempt to change modes (e.g., back to the mode before the change performed based on receiving the message). In certain aspects, the prohibit timer may be a deterministic timer that indicates an actual time period to backoff from attempting to change modes. In certain aspects, the prohibit timer may be a probabilistic timer. For example, the prohibit timer may indicate a number. Further, each UE 120 receiving the prohibit timer may generate a (pseudo) random number (e.g., within a range) and multiply the random number by the number indicated in the prohibit timer to generate a threshold time. Then, the UE 120 may use the threshold time as a time period to backoff from attempting to change modes. In certain aspects, the prohibit timer is configured at each UE 120 using RRC (e.g., using RRC messages). For example, the prohibit timer may be sent separately from the message (e.g., which may be sent in a physical control channel).

In certain aspects, the communication of the message indicating to change modes, the signaling of a single identifier for a group of UEs 120, and/or the communication of a prohibit timer from BS 110 to a UE 120 may be secured. Securing such communication may help prevent rogue or unauthorized devices from changing the modes of UEs 120 using messaging as discussed herein.

For example, the BS 110 may encrypt the communication (e.g., using a key (e.g., ciphering key, integrity protection key, etc.), by scrambling communications, etc.). In certain aspects, all UEs 120 in a group may use the same encryption/decryption (e.g., same key) for encrypting/decrypting such communication between the BS 110 and UE 120 to ensure each of the UEs 120 in the group can decrypt the communication. For example, the BS 110 may use one key to encrypt the communication, and each UE 120 may have the corresponding key needed to decrypt the communication and accordingly decrypt the communication. In certain aspects, the encryption may be performed at the access stratum layer, or the network address translation (NAT) layer.

In certain aspects, the key used for encryption is exchanged between BS 110 and the UEs 120 using a standard key exchange when the UEs 120 are in connected mode. In some aspects, the key is delivered using RRC (e.g., during an RRC connection procedure between a UE 120 and BS 110) (e.g., as a dedicated message). In certain aspects, the BS 110 or another entity in the core network (also referred to as a network node) (e.g., MME or AMF) is configured to select the key.

In certain aspects, a key used for encryption between BS 110 and a group of UEs 120 may be updated (e.g., periodically, due to occurrence of an event, etc.). In certain aspects, the BS 110 pages the UE in connected mode, the page indicating to the UE 120 a timing (e.g., subframe) to listen for and receive the updated key (e.g., in a message (e.g., Layer 1, such as PDCCH or Layer 2) including an identifier associated with the UEs 120 and optionally an update bit). For example, the UE 120 may be in a DRX mode where the receiver of UE 120 may be off or in a low power state at certain times, and only is turned on to receive signals at certain times. The UEs 120 may receive the page and listen for and receive the updated key during the indicated timing.

Figure 7:
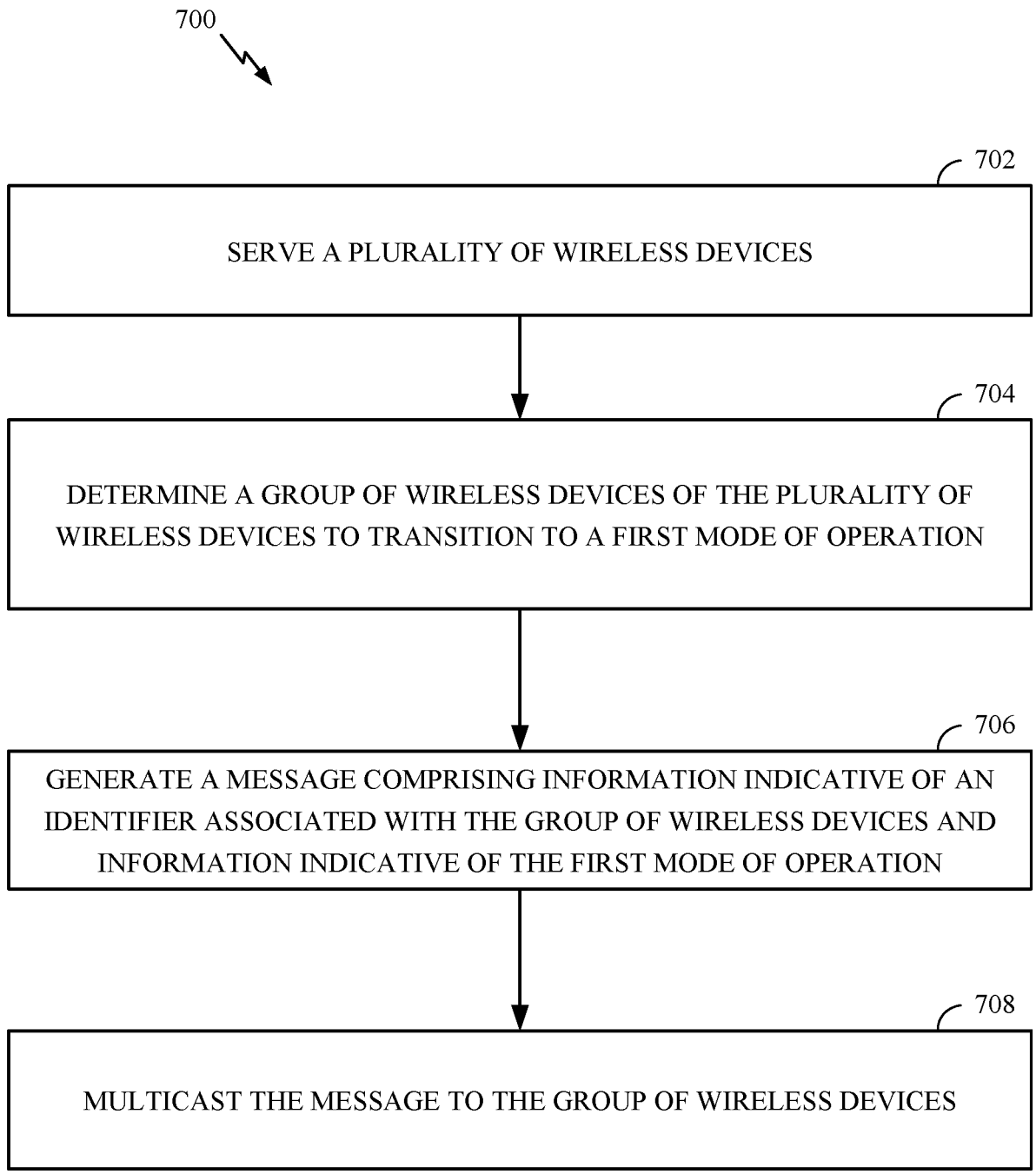
FIG. 7 illustrates example operations for signaling a mode change for a group of UEs, in accordance with certain aspects.

FIG. 7 illustrates example operations 700 for signaling a mode change for a group of UEs, in accordance with certain aspects. According to certain aspects, operations 700 may be performed by a BS (e.g., one or more of the BSs 110).

Operations 700 begin at 702 where the BS 110 serves a plurality of wireless devices. At 704, the BS 110 determines a group of wireless devices of the plurality of wireless devices to transition to a first mode of operation. In certain aspects, at least one of: the first mode of operation is an inactive mode or at least one of the group of wireless devices is in the inactive mode. At 706, the BS 110 generates a message comprising information indicative of an identifier associated with the group of wireless devices and information indicative of the first mode of operation. At 708, the BS 110 multicasts the message to the group of wireless devices.

Figure 8:
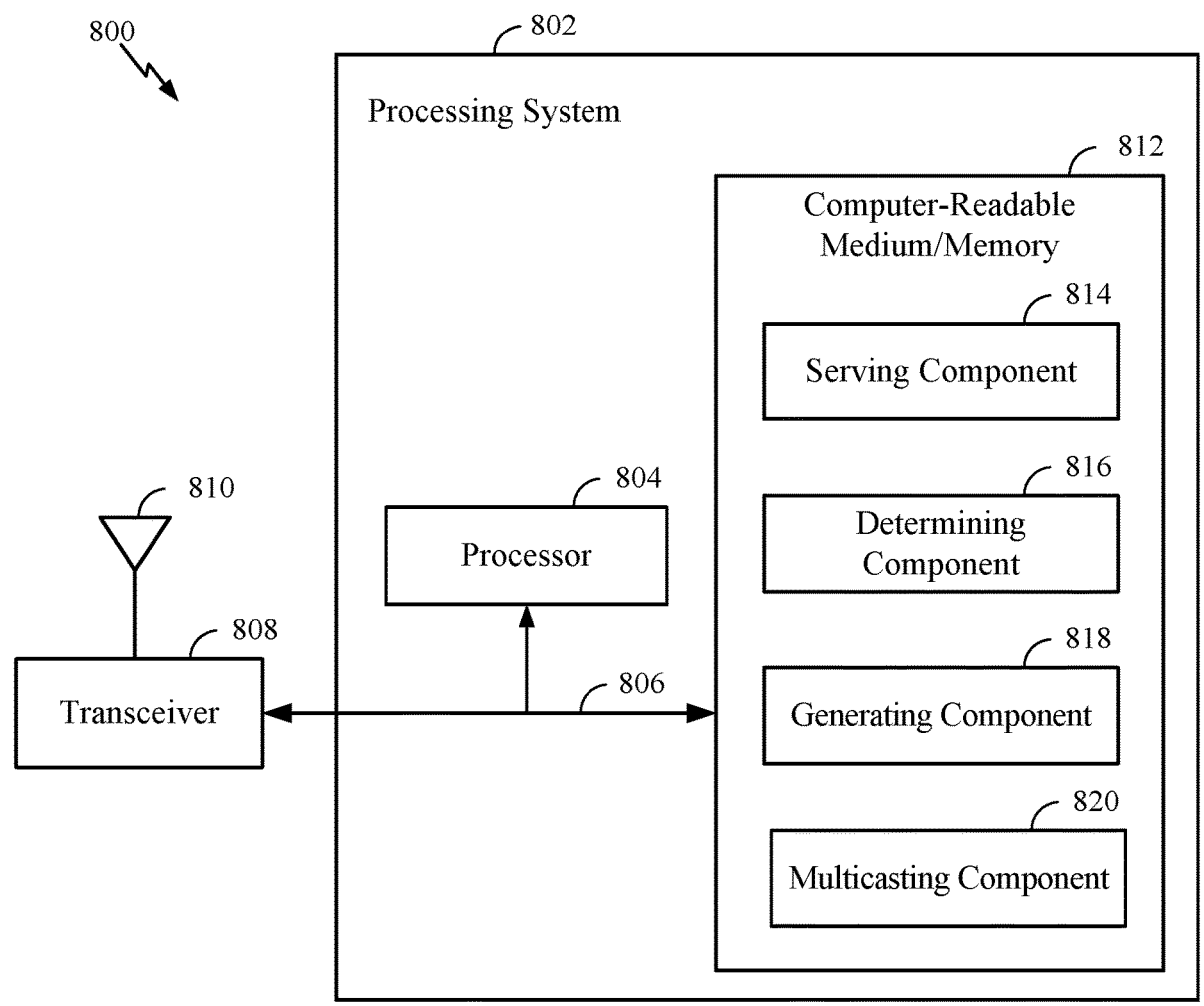
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIG. 7. The communications device 800 includes a processing system 802 coupled to a transceiver 808. The transceiver 808 is configured to transmit and receive signals for the communications device 800 via an antenna 810, such as the various signal described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions that when executed by processor 804, cause the processor 804 to perform the operations illustrated in FIG. 7, or other operations for performing the various techniques discussed herein.

In certain aspects, the processing system 802 further includes a serving component 814 for performing the operations illustrated in 702 of FIG. 7. Additionally, the processing system 802 includes a determining component 816 for performing the operations illustrated in 704 of FIG. 7. Additionally, the processing system 802 includes a generating component 818 for performing the operations illustrated in 706 of FIG. 7. Additionally, the processing system 802 includes a multicasting component 820 for performing the operations illustrated in 708 of FIG. 7. The serving component 814, determining component 816, generating component 818, and multicasting component 820 may be coupled to the processor 804 via bus 806. In certain aspects, the serving component 814, determining component 816, generating component 818, and multicasting component 820 may be hardware circuits. In certain aspects, the serving component 814, determining component 816, generating component 818, and multicasting component 820 may be software components that are executed and run on processor 804.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for signaling mode changes to a group of wireless devices, the method comprising:
serving, by a base station, a plurality of wireless devices;
determining, by the base station, a group of wireless devices of the plurality of wireless devices to transition to a first mode of operation, wherein the first mode of operation is an inactive mode;
generating, by the base station, a message comprising information indicative of an identifier of the group of wireless devices and information indicative of the first mode of operation wherein the information indicative of the first mode of operation indicates to transition from a connected mode to the inactive mode; and
multicasting, by the base station, the message to the group of wireless devices.

2. The method of claim 1, wherein the information indicative of the first mode of operation indicates to transition from a connected mode or an idle mode.

3. The method of claim 1, wherein the identifier comprises a common radio network temporary identifier (RNTI) associated with each of the wireless devices of the group of wireless devices.

4. The method of claim 1, further comprising:
assigning the identifier to the group of wireless devices based on the group of wireless devices sharing one or more attributes; and
transmitting the identifier to each wireless device of the group of wireless devices.

5. The method of claim 4, wherein the one or more attributes comprise a numerology, slice, access class, access information, or subscription information associated with each wireless device of the group of wireless devices.

6. The method of claim 1, further comprising transmitting an indication of a timer that indicates a time period when the group of wireless devices should not change a mode of operation after transitioning to the first mode of operation.

7. The method of claim 1, wherein communication between the base station and the group of wireless devices is secured using a key.

8. The method of claim 7, wherein the key is determined by at least one of the base station or another network node and delivered via a radio resource control message from the base station to each of the group of wireless devices.

9. The method of claim 8, further comprising transmitting to the group of wireless devices an updated key to use for securing the communication.

10. The method of claim 9, wherein the updated key is transmitted in another message including the identifier of the group of wireless devices.

11. The method of claim 1, further comprising paging the group of wireless devices to indicate when to receive at least one of the message or a key for securing communication between the base station and the group of wireless devices.

12. A base station comprising:
a memory; and
a processor configured to:
determine, by the base station, a group of wireless devices of a plurality of wireless devices served by the base station to transition to a first mode of operation, wherein the first mode of operation is an inactive mode;

generate a message comprising information indicative of an identifier of the group of wireless devices and information indicative of the first mode of operation wherein the information indicative of the first mode of operation indicates to transition from a connected mode to the inactive mode; and multicast the message to the group of wireless devices.

13. The base station of claim 12, wherein the information indicative of the first mode of operation indicates to transition from a connected mode or an idle mode.

14. The base station of claim 12, wherein the identifier comprises a common radio network temporary identifier (RNTI) associated with each of the wireless devices of the group of wireless devices.

15. The base station of claim 12, wherein the processor is further configured to:

assign the identifier to the group of wireless devices based on the group of wireless devices sharing one or more attributes; and transmit the identifier to each wireless device of the group of wireless devices.

16. The base station of claim 15, wherein the one or more attributes comprise a numerology, slice, access class, access information, or subscription information associated with each wireless device of the group of wireless devices.

17. The base station of claim 12, wherein the processor is further configured to transmit an indication of a timer that indicates a time period when the group of wireless devices should not change a mode of operation after transitioning to the first mode of operation.

18. The base station of claim 12, wherein communication between the base station and the group of wireless devices is secured using a key.

19. The base station of claim 18, wherein the key is determined by at least one of the base station or another network node and delivered via a radio resource control message from the base station to each of the group of wireless devices.

20. A base station comprising:

means for serving a plurality of wireless devices;

means for determining a group of wireless devices of the plurality of wireless devices to transition to a first mode of operation, wherein the first mode of operation is an inactive mode;

means for generating a message comprising information indicative of an identifier of the group of wireless devices and information indicative of the first mode of operation wherein the information indicative of the first mode of operation indicates to transition from a connected mode to the inactive mode; and means for multicasting the message to the group of wireless devices.

21. The base station of claim 20, wherein the information indicative of the first mode of operation indicates to transition from a connected mode to the inactive mode.

22. The base station of claim 20, wherein the information indicative of the first mode of operation indicates to transition from a connected mode or an idle mode.

23. The base station of claim 20, wherein the identifier comprises a common radio network temporary identifier (RNTI) associated with each of the wireless devices of the group of wireless devices.

24. The base station of claim 20, further comprising:

means for assigning the identifier to the group of wireless devices based on the group of wireless devices sharing one or more attributes; and means for transmitting the identifier to each wireless device of the group of wireless devices.

25. A non-transitory computer readable storage medium that stores instructions that when executed by a base station cause the base station to perform a method for signaling mode changes to a group of wireless devices, the method comprising:

serving, by the base station, a plurality of wireless devices;

determining, by the base station, a group of wireless devices of the plurality of wireless devices to transition to a first mode of operation, wherein the first mode of operation is an inactive mode;

generating, by the base station, a message comprising information indicative of an identifier of the group of wireless devices and information indicative of the first mode of operation wherein the information indicative of the first mode of operation indicates to transition from a connected mode to the inactive mode; and multicasting, by the base station, the message to the group of wireless devices.

26. The non-transitory computer-readable storage medium of claim 25, wherein the information indicative of the first mode of operation indicates to transition from a connected mode to the inactive mode.

27. The non-transitory computer-readable storage medium of claim 25, wherein the information indicative of the first mode of operation indicates to transition from a connected mode or an idle mode.

28. The non-transitory computer-readable storage medium of claim 25, wherein the method further comprises:

assigning the identifier to the group of wireless devices based on the group of wireless devices sharing one or more attributes; and transmitting the identifier to each wireless device of the group of wireless devices.

* * * * *